Dec. 23, 1958     D. H. MASH     2,866,182
CLOSED-CIRCUIT TELEVISION SYSTEMS
Filed Aug. 14, 1957
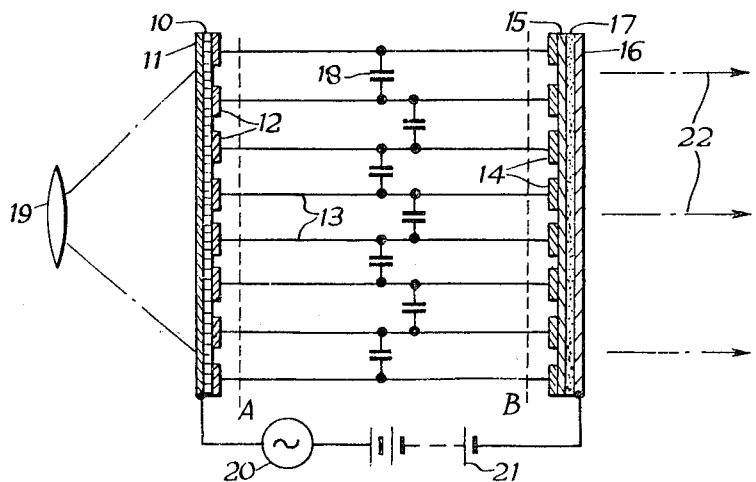
INVENTOR
DEREK HUBERT MASH
BY *Lawrence Burns*
ATTORNEY

United States Patent Office 2,866,182
Patented Dec. 23, 1958

2,866,182

CLOSED-CIRCUIT TELEVISION SYSTEMS

Derek Hubert Mash, London, England, assignor to Thorn Electrical Industries Limited Application August 14, 1957, Serial No. 678,231

Claims priority, application Great Britain August 28, 1956

2 Claims. (Cl. 340—324)

The present invention relates to closed-circuit television systems of the type in which a camera device is coupled by wires to a reproducing device, each element of the camera device being connected by a separate conductor to the corresponding element of the reproducing device.

A system of this type that offers advantages such as cheapness and simplicity is one using photo-conductive elements in the camera and electro-luminescent elements in the reproducing device.

A difficulty arises, however, since electroluminescent elements require alternating current for effective operation and, using any practically useful length of multi-wire cable connecting the camera elements with the reproducer elements, the capacitance coupling between the wires renders the system impracticable.

The present invention has for its object to provide a television system of the type referred to in which the the adverse effect of capacitance between wires is substantially reduced.

According to the present invention, a television system of the type set forth comprises a camera device having a screen including a layer of photo-conductive material between two electrodes one of which is light-transmitting and the other of which is a mosaic of mutually-insulated electrically-conducting elements and means for forming an image of an object to be televised upon the photo-conductive layer through the light-transmitting electrode, a reproducing device comprising superimposed electrically conducting layers of electroluminescent and super-linear resistive material between two electrodes of which the one adjacent the super-linear resistive layer is a mosaic of mutually-insulated electrically-conducting elements and of which the other is light-transmitting, wires connecting the coresponding elements of the two mosaics together respectively and means for applying an alternating voltage in series with a direct voltage between the two light-transmitting electrodes.

A super-linear resistive material is a material in which the current varies as a power greater than unity of the voltage applied thereto.

The invention will be described, by way of example, with reference to the accompanying drawing which is a diagrammatic representation of one embodiment thereof.

In the drawing, a layer 10 of photo-conductive material is between the transparent conducting layer 11 and a mosaic 12 of mutually-insulated conducting elements which are connected by wires 13 to corresponding conducting elements 14 of a like mosaic respectively. The mosaic elements 14 are in contact with a layer 15 of super-linear resistive material, such as silicon carbide in a suitable binder, and between this layer and a transparent electrode 16 is a layer 17 of electro-luminescent material. The distributed capacitances between the connecting wires 13 are represented at 18. An optical system represented by a lens 19 forms an image on the layer 10 through the electrode 11. An alternating current source 20 and a direct current source 21 are connected in series between the two electrodes 11 and 16.

The wires 13 may be "Litz" wires bound into a cable of any required length. For 50,000 such wires the diameter of the cable may be about one inch. The luminescent layer 17 is rendered suitably conducting by the inclusion with the electroluminescent material of a suitable powdered conductor such as graphite.

It will be seen that alternating current from the supply passes through the photo-conductive layer 10 partly capacitively and in those regions that are illuminated, partly resistively, and into the wires 13. Owing to the capacitive coupling between the wires, at the plane B near to the mosaic 14, the A. C. potential will be approximately the same on all the wires. The D. C. is, however, fed to the wires 13 only where the photo-conductive layer is illuminated and at the plane A the wires have a pattern of D. C. potential corresponding to the image on the photo-conductive layer. This pattern is maintained to the plane B since there is no D. C. leakage between the wires. The resistance of the super-linear resistive layer 15 at any point is determined by the electric field across it, and the D. C. pattern is therefore, converted by this layer into a resistance pattern, which controls the A. C. applied to the electroluminescent layer. The light emitted as indicated at 22 is therefore, a reproduction of the image formed on the layer 10 by the lens 19.

I claim:

1. A closed-circuit television system comprising a camera device having a screen including a first light-transmitting conducting electrode, a first mosaic electrode of mutually-insulated conducting elements and a layer of photo-conductive material between and in electrical contact with said electrodes, a reproducing device having a screen including a second light-transmitting conducting electrode, a second mosaic electrode of mutually-insulated conducting elements and superimposed layers of electroluminescent and super-linear resistive material between said second electrodes, electrically conducting members interconnecting individual elements of said first mosaic electrode with individual elements of said second mosaic electrode respectively, and means for applying an alternating voltage in series with a direct voltage between said first and second light-transmitting electrodes.

2. A system according to claim 1, comprising means for forming an image of an object to be televised upon said photo-conductive layer through said first light-transmitting layer.

No references cited.